(12) United States Patent
Lau et al.

(10) Patent No.: US 8,370,752 B2
(45) Date of Patent: Feb. 5, 2013

(54) AUTOMATIC PERSONALIZATION OF USER VISUALIZATION AND INTERACTION IN A SERVICE-ORIENTED ARCHITECTURE INTERFACE

(75) Inventors: Diana H. Lau, Toronto (CA); Helena Litani, Thornhill (CA); Joanna W. Ng, Unionville (CA); Leho Nigul, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 12/205,296

(22) Filed: Sep. 5, 2008

(65) Prior Publication Data

US 2010/0064229 A1 Mar. 11, 2010

(51) Int. Cl.
*G06F 3/00* (2006.01)
(52) U.S. Cl. ........................ 715/744; 717/104
(58) Field of Classification Search .................. 715/744; 717/104
See application file for complete search history.

(56) References Cited

U.S. PATENT DOCUMENTS

| | | | |
|---|---|---|---|
| 6,766,368 B1 | 7/2004 | Jakobson et al. | |
| 6,856,989 B1 * | 2/2005 | Zhou et al. ............................ | 1/1 |
| 2005/0010598 A1 | 1/2005 | Shankar | |
| 2005/0015643 A1 * | 1/2005 | Davis et al. ........................ | 714/4 |
| 2005/0041042 A1 | 2/2005 | Rajarajan et al. | |
| 2005/0138631 A1 | 6/2005 | Bellotti et al. | |
| 2005/0228791 A1 * | 10/2005 | Thusoo et al. ..................... | 707/6 |
| 2006/0136242 A1 | 6/2006 | Goodman | |
| 2006/0253840 A1 | 11/2006 | Cruickshank et al. | |
| 2007/0100887 A1 | 5/2007 | Subramanian et al. | |
| 2007/0101316 A1 | 5/2007 | Berndt | |
| 2007/0236502 A1 | 10/2007 | Huang et al. | |
| 2007/0279416 A1 | 12/2007 | Cobb et al. | |
| 2008/0164908 A1 * | 7/2008 | Challenger et al. ............. | 326/46 |

OTHER PUBLICATIONS

Groth et al., "Tracking User Interactions Within Visualizations", IEEE Computer Society, Washington, DC, USA, 1994, pp. 1-2.
Niskanen et al., "An Interactive Ontology Visualization Approach for the Domain of Networked Home Environments", ESPOO 2007, VTT Publications 649, pp. 1-138.

* cited by examiner

*Primary Examiner* — Boris Pesin
*Assistant Examiner* — Angie Badawi
(74) *Attorney, Agent, or Firm* — Yee & Associates, P.C.; David A. Mims, Jr.

(57) ABSTRACT

Automatically generating visualization artifacts corresponding to related service operation interfaces is provided. A user level visualization finite state machine instance is created for a specific service instance based on user activation and deactivation of service operations in the specific service instance and user selection of a start visualization state. The service operations are included in a service level visualization finite state machine instance for the specific service instance. Visualization artifacts are automatically generated based on the user level visualization finite state machine instance and parameterized entities bound to a concrete visualization component. The visualization artifacts are outputted in a service operation interface of the specific service instance for a user to visualize and interact with, resulting in the elimination of individual user unwanted server side function in the units of service operations without server side processing.

14 Claims, 7 Drawing Sheets

VISUALIZATION TEMPLATE TYPE AND VISUALIZATION STATE ASSOCIATION TABLE 700

| VISUALIZATION TEMPLATE TYPE 702 | VISUALIZATION STATE 704 | REQUIRED ELEMENTS 706 | OPTIONAL ELEMENTS 708 |
|---|---|---|---|
| SERVICE LOGO | SERVICE ENTITY | AN IMAGE FILE A MNEMONIC TEXT LABEL | NONE |
| ACCESS ID DIALOG | SET ACCESS IDENTIFICATION | A SET ACCESS DIALOG A MNEMONIC TEXT LABEL | NONE |
| SERVICE INTERFACE OPERATION MENU | SERVICE INTERFACE OPERATION MENU | DIALOG BOX FOR SERVICE OPERATION LIST | |
| VALIDATE CURRENT ACCESS | CURRENT ACCESS VALIDATION | DIALOG BOX FOR CURRENT PIN | |
| SERVICE INTERFACE OPERATION TEXT | DO SERVICE INTERFACE OPERATION | A MNEMONIC TEXT LABEL | HELP MENU |
| IN MESSAGE INPUT | HANDLE IN MESSAGE INTERFACE OPERATION | CONTROL TO PROVIDE IN MESSAGE INSTANCE | |
| OUT MESSAGE OUTPUT | HANDLE OUT MESSAGE INTERFACE OPERATION | VISUALIZATION OF OUTPUT MESSAGE A MNEMONIC TEXT LABEL | |
| CUSTOMIZATION CONTROL MENU TEXT | USER CUSTOMIZATION CONTROL | (i) DIALOG BOX TO ACTIVATE AND DEACTIVATE SERVICE OPERATION (ii) DIALOG BOX TO SELECT START STATE: "SERVICE INTERFACE OPERATION MENU" OR "SERVICE ENTITY" (iii) VISUALIZATION TEMPLATE CHOICES | HELP MENU |
| NEXT OPERATION | CONTINUE | CONTROL TO GO TO NEXT OPERATION | |
| END | FINAL | | GOOD BYE MESSAGE |

*FIG. 7*

Sample Scenario — 800
Airline ABC wants to provide a service to enable clients to:
    i. check Frequent Flyer Points
    ii. Query Flight Availability
    iii. Transfer Frequent Flyer Points

*FIG. 8*

Airline ABC develops a service instance that includes following elements:
  Service Entity:
    802
      i. Service name: Frequent Flyer Program
      ii. Service endpoint: http://great.example.com/2004/FrequentFlyerProgram
  Service Interface Operation:
    804
      i. check Frequent Flyer Points: in: my Frequent Flyer Card Number
        out: Total Points
      ii. query Flight Availability: in: starting Location, destination, start Date, return Date,
        number of travelers    out: Flight instance
      iii. transfer Frequent Flyer Points: in: my Frequent Flyer Card Number,
        recipient Frequent Flyer Card Number    out: transfer status
  Service in message definition:
    806
      i. Frequent Flyer Card Number
      ii. starting Location
      iii. destination
      iv. start Date
      v. return Date
      vi. number of travelers
  Service out message definition: — 808
      i. Total Points
      ii. Flight instance
      iii. Transfer status  810

Service Level Visualization FSM Instance of the "Frequent Flyer Program" service instance has three branches of Service Interface Operation:
    -check Frequent Flyer Points
    -query Flight Availability
    -transfer Frequent Flyer Points
    812 with corresponding In Message and Out Message for each service interface operation Concrete visualization component is created by providing all the image icons, user interface widgets, etc.
User Level Visualization FSM instance is generated after user select:
i. activate all three  814
(or a smaller subset of) the service interface operation (e.g. user can decide to deactivate "transfer Frequent Flyer Points" as user will never use it); and
ii. set visualization state "Service Interface Operation Menu" as the start state (instead of "service entity" state Based on the user level visualization FSM, the output visualization artifacts are generated:
For example:    816
-the html of the "service interface operation menu" only shows two available service interface operations (check Frequent Flyer points & query Flight availability) instead of the default three.
The branch for 'transfer Frequent Flyer Points' does not exist in the user level visualization FSM instance (though it exists in the service level visualization FSM instance).

FIG. 9

AUTOMATIC PERSONALIZATION OF USER VISUALIZATION AND INTERACTION IN A SERVICE-ORIENTED ARCHITECTURE INTERFACE

BACKGROUND OF THE INVENTION

1. Field of the Invention

The present invention relates generally to an improved data processing system and more specifically to a computer implemented method, system, and computer usable program code for automatic individualized personalization of user visualization and user interaction in a service-oriented architecture interface.

2. Description of the Related Art

Today, all web page presentations are a result of programmers' design and implementation of software programs. Such software program creation for web pages often involves intensively deep technical skill, effort, and time. In addition, programmers need to carefully craft user interaction flows for these web page presentations. In the case of browser-based user interaction flows, a server programmatically determines and generates the user interface for the web page presentations. Currently, this programmatic server approach is error prone, expensive to create and maintain, and has a very limited degree of customization. True individual user level personalization of web page presentations, where the personalization control lies in the hands of the users and not the servers and not totally controlled by programmers, does not exist because this user level personalization is impossible to achieve under the current server side programmatic way of presenting web pages.

BRIEF SUMMARY OF THE INVENTION

According to one embodiment of the present invention, visualization artifacts corresponding to related service operation interfaces are automatically generated. A user level visualization finite state machine instance is created for a specific service instance based on user activation and deactivation of service operations in the specific service instance and user selection of a start visualization state. The service operations are included in a service level visualization finite state machine instance for the specific service instance. Visualization artifacts are automatically generated based on the user level visualization finite state machine instance and parameterized entities bound to a concrete visualization component. The visualization artifacts are outputted in a service operation interface of the specific service instance for a user to visualize and interact with.

BRIEF DESCRIPTION OF THE SEVERAL VIEWS OF THE DRAWINGS

FIG. 8 is a sample scenario in accordance with an illustrative embodiment; and

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
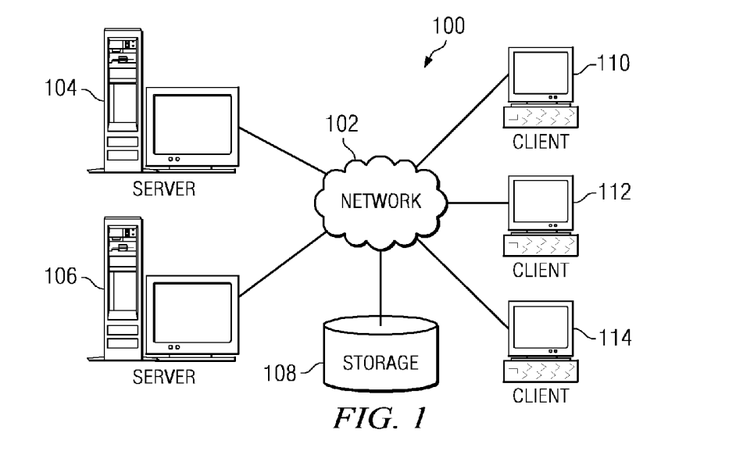
FIG. 1 is a pictorial representation of a network of data processing systems in which illustrative embodiments may be implemented.
Figure 2:
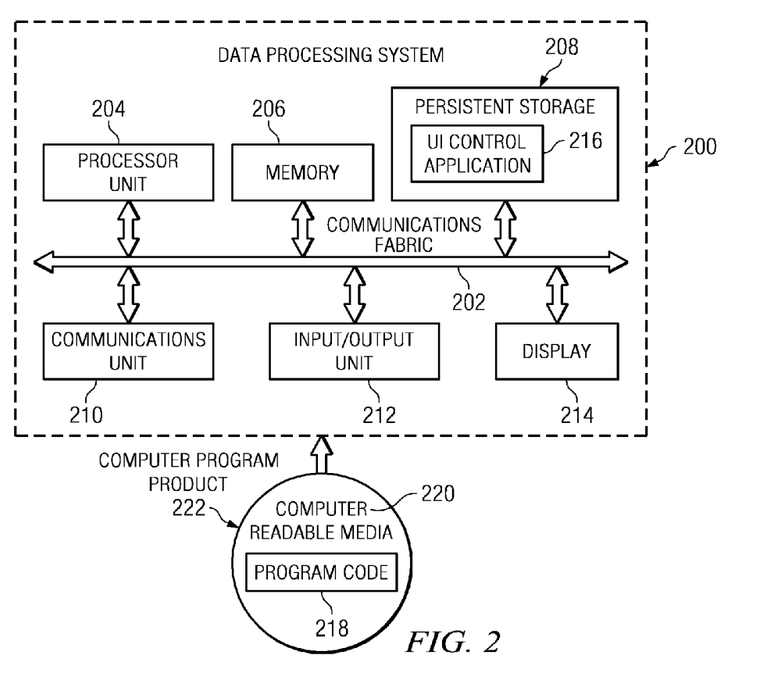
FIG. 2 is a diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 contains network 102. Network 102 is the medium used to provide communications links between the various computers and other devices connected together within network data processing system 100. Network 102 may include connections, such as wire, wireless communication links, or fiber optic cables.

In the depicted example, server 104 and server 106 connect to network 102, along with storage unit 108. Storage 108 represents any type of storage device that is capable of storing data in a structured or unstructured format. Also, storage 108 may represent a plurality of storage units coupled to network 102. Storage 108 may, for example, be a database that stores data for a plurality of service-oriented architecture (SOA) web page service presentations. SOA is a software architecture where functionality is grouped around business processes and packaged as interoperable services. A service may, for example, be filling out an online application for an account, viewing an online bank statement, or placing an online airline ticket order.

Client devices 110, 112, and 114 also connect to network 102. Client devices 110, 112, and 114 may, for example, be personal computers, network computers, personal digital assistants (PDAs), or smart cellular telephones. Client devices 110, 112, and 114 are clients to server 104 and/or server 106 in this example.

Server 104 and/or server 106 may, for example, provide SOA web services to client devices 110, 112, and 114. Furthermore, server 104 and server 106 may also provide data, such as boot files, operating system images, and applications to client devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes of the illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

User interface (UI) control application 216 resides on persistent storage 208. UI control application 216 is a software application that automatically generates personalized user visualizations and user interaction flows in SOA interfaces. UI control application 216 automatically generates these personalized user visualizations and user interaction flows based on user commands to activate and deactivate service operations within specific SOA service models.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through a keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 218 is located in a functional form on computer-readable media 220 and may be loaded onto or transferred to data processing system 200 for execution by processor unit 204. Program code 218 and computer-readable media 220 form computer program product 222 in these examples. In one example, computer-readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 220 also may take the form of a persistent storage, such as a hard drive or a flash memory that is connected to data processing system 200. The tangible form of computer-readable media 220 is also referred to as computer-recordable storage media.

Alternatively, program code 218 may be transferred to data processing system 200 from computer-readable media 220 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for automatic individualized personalization of user visualization and user interaction in service operation interfaces of an instance of a specific online service. Illustrative embodiments allow an end user to control UI components as visualization templates, as well as UI flows, without requiring technical skills for JavaScript® or JavaScript® based commands, but by user activation or deactivation of service operation interfaces. Illustrative embodiments allow this end user control based on a service level visualization finite state machine (FSM). A FSM is a model of behavior composed of a finite number of states, transitions between those states, and actions. A state stores information that reflects the input changes from system start to the present moment. A transition indicates a state change and is described by a condition that would need to be fulfilled to enable the transition. An action is a description of an activity that is to be performed at a given moment.

Each node of the service level visualization FSM is a visualization state. A visualization state is a particular context or what an end user sees within a service operation interface. Each node of the service level visualization FSM is associated with a corresponding visualization template. Each directed edge or transition in the service level visualization FSM is a predetermined user action. Illustrative embodiments present end users with customization controls, which end users select to activate or deactivate each directed edge or branch of the service level visualization FSM that represents a service operation of a specific instance of a service definition.

After user customization of the service level visualization FSM is finished, illustrative embodiments generate a user level visualization FSM, which is a sub-set of the service level visualization FSM, representing the dynamic user selections to activate or deactivate each directed edge or branch. By traversing each node of the user level visualization FSM, together with the corresponding visualization template of each node, illustrative embodiments automatically generate the individually customized UI components and UI flows.

Figure 3:
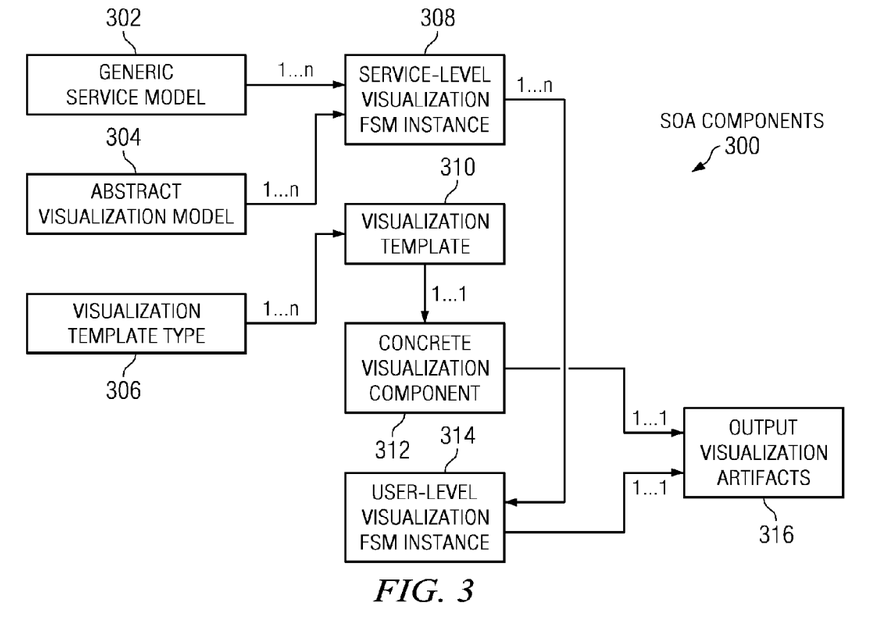
FIG. 3 is an exemplary overview illustration of service oriented architecture components in accordance with an illustrative embodiment.

With reference now to FIG. 3, an exemplary overview illustration of SOA components is depicted in accordance with an illustrative embodiment. SOA components 300 are components that a UI control application, such as, UI control application, 216 in FIG. 2, utilizes to automatically generate personalized user visualization and user interaction in an SOA service operation interface. SOA components 300 include generic service model 302, abstract visualization model 304, visualization template type 306, service level visualization FSM instance 308, visualization template 310, concrete visualization component 312, user level visualization FSM instance 314, and output visualization artifacts 316.

Generic service model 302 defines model elements and properties that constitute a formal definition of the SOA service. A programmer creates generic service model 302. Generic service model 302 typically includes a service endpoint that defines a network location for the service, a set of defined service operation interfaces, a data model for input messages and out messages, and a service access identification model that defines a data structure required for secure end user access. The set of defined service operation interfaces may be synchronous, asynchronous, or a combination thereof.

The programmer also creates abstract visualization model 304. The programmer derives or creates abstract visualization model 304 from generic user interaction patterns and the model elements associated with generic service model 302. In addition, the programmer binds each user interaction unit, or predetermined user action, with a corresponding model element defined in generic service model 302. Thus, the programmer creates an abstract deterministic Mealy FSM to formally capture the generic user interaction pattern.

The programmer may express abstract visualization model 304 as a directed graph. Alternatively, abstract visualization model 304 may be expressed as a state transition table. Each state of abstract visualization model 304 is a visualization state. Each directed edge or transition condition of the directed graph of abstract visualization model 304 is a predetermined user action.

Subsequent to creating abstract visualization model 304, the programmer creates visualization template type 306 for each visualization state in abstract visualization model 304. Each visualization template type 306 has a one-to-one binding with each visualization state in abstract visualization model 304. Each visualization template type 306 defines parameterization points and other points of variability for the associated visualization state. Parameterization points and other points of variability define how an end user desires to see data, such as, for example, in a pie chart or a bar graph, within a service interface.

Even though each visualization state has only one visualization template type 306 associated with it, each visualization template type 306 may be associated with one or more instances of visualization templates for the end user to choose from. Visualization template 310 is the same type of template as visualization template type 306. In other words, different versions of visualization template 310 define different themes, skins, layout styles, and the like for the visualization state associated with visualization template type 306. If more than one visualization template 310 exists for a visualization state, then the user or the UI control application may set one of the visualization templates as a default selection.

For a specific service definition instance, such as, for example, an online personal banking service, which is compliant with generic service model 302, the UI control application may instantiate corresponding service level visualization FSM instance 308 for that specific service instance based on generic service model 302 and abstract visualization model 304. Each service operation interface has a corresponding directed edge or branch, which represents a predetermined user action, in the directed graph of service level visualization FSM instance 308. The UI control application may tag each branch of the service operation interface as "activated" or "deactivated" based on user selection, which enables true individualized personalization of a service interface by the user. However, it should be noted that all service operation interfaces are "activated" by default.

Then, the UI control application creates concrete visualization component 312 for each visualization state in abstract visualization model 304. Concrete means that no unknowns exist in concrete visualization component 312. In other words, concrete visualization component 312 is not abstract and is the actual visualization component.

The UI control application creates concrete visualization component 312 utilizing visualization template 310. If more than one visualization template 310 exists and the end user does not select one of the visualization templates associated with visualization template type 306, then the UI control application utilizes a default visualization template. The UI control application binds parameterized entities (i.e., the parameterization points and other points of variability defined by visualization template type 306) with concrete entities, such as, for example, actual image files, actual parameter values, or actual text for mnemonic strings, of the selected visualization template 310 to create concrete visualization component 312 for the corresponding visualization state.

Subsequently, the UI control application creates user level visualization FSM instance 314 by activating or deactivating service operation interface branches in service level visualization FSM instance 308 based on user selection. In addition, the UI control application also sets a start state for the specific service instance based on user selection.

Finally, the UI control application generates output visualization artifacts 316. Output visualization artifacts 316 may, for example, be hypertext markup language (HTML) code fragments with imbedded image files, JavaScript®, and the like. The UI control application dynamically computes and generates output visualization artifacts 316 based on user level visualization FSM instance 314 and the visual artifact bindings with each visualization node of concrete visualization component 312. The UI control application displays output visualization artifacts 316 in a display device, such as display 214 in FIG. 2, for the user to view and interact with using an input device, such as, for example, input/output unit 212 in FIG. 2. As a result, illustrative embodiments not only provide automatic generation of user visualization and interaction artifacts, but illustrative embodiments also provide user-based personalization such that each user may, at a user's level and not at a programmer's level, have an individually tailored user visualization and interaction experience with any service instance.

Figure 4:
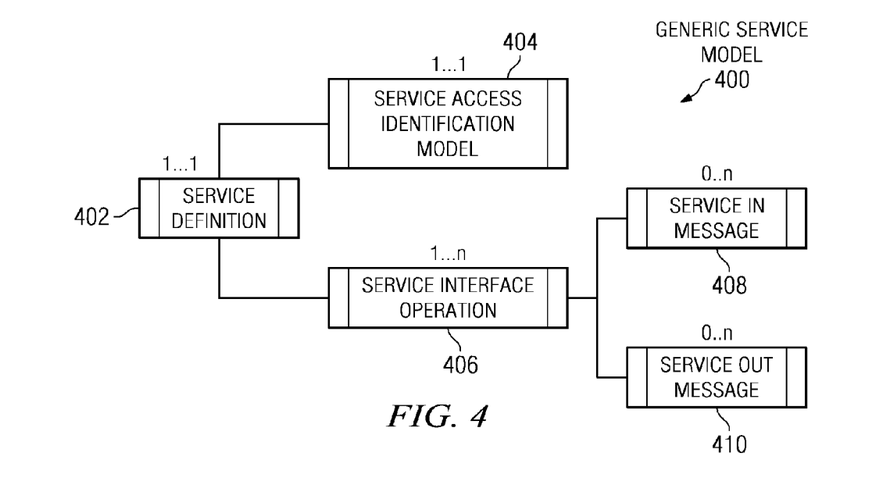
FIG. 4 is an exemplary illustration of a generic service model in accordance with an illustrative embodiment.

With reference now to FIG. 4, an exemplary illustration of a generic service model is depicted in accordance with an illustrative embodiment. Generic service model 400 may, for example, be generic service model 302 in FIG. 3. Generic service model 400 includes model elements service definition 402, service access identification model 404, service interface operation 406, service in message 408, and service out message 410.

Model element service definition 402 formally defines the specific service instance that the end user desires to use. Model element service access identification model 404 defines the data structure required for the end user to securely access the specific service instance defined by service definition 402. Model element service interface operation 406 defines a set of one or more service interface operations, which the end user utilizes to interact with the specific service instance defined by service definition 402. Model element service in message 408 defines a set of zero or more in messages, such as, for example, a dollar amount for a transfer entered by a user in an interface dialog box, for the specific service instance defined by service definition 402. Model element service out message 410 defines a set of zero or more out messages, such as, for example, a bank account balance, for the specific service instance defined by service definition 402.

Figure 5:
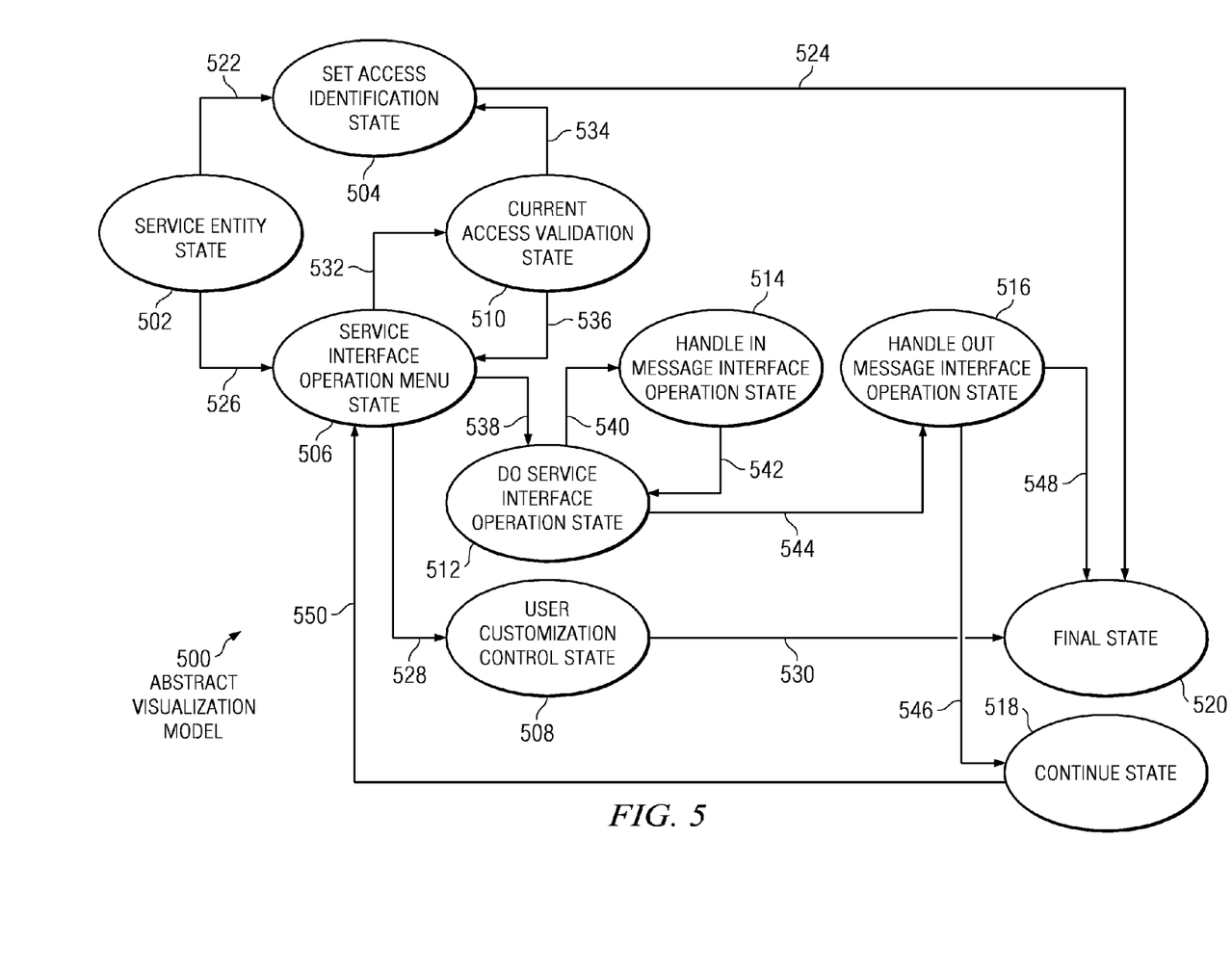
FIG. 5 is an exemplary illustration of an abstract visualization model in accordance with an illustrative embodiment.

With reference now to FIG. 5, an exemplary illustration of an abstract visualization model is depicted in accordance with an illustrative embodiment. Abstract visualization model 500 may, for example, be abstract visualization model 304 in FIG. 3. Abstract visualization model 500 includes service entity state 502, set access identification state 504, service interface operation menu state 506, user customization control state 508, current access validation state 510, do service interface operation state 512, handle in message interface operation state 514, handle out message interface operation state 516, continue state 518, and final state 520.

Service entity state 502 serves as an initial base state for a specific service instance. The visualization template for service entity state 502 usually consists of a service graphical icon, such as, for example, a dollar sign for an online personal banking service. Set access identification state 504 sets access identification for secure user access to the specific service instance. Service interface operation menu state 506 provides a menu of interface operations for the specific service instance for the end user to choose from. User customization control state 508 provides the user with the ability to set individualized customization of the service interface components and service interface flows for the specific service instance.

Current access validation state 510 allows the user to update the current access identification. Do service interface operation state 512 performs one or more service operations for the specific service instance. Handle in message interface operation state 514 handles zero or more in message operations for the specific service instance. Handle out message interface operation state 516 handles zero or more out message operations for the specific service instance. Continue state 518 provides control to the next service operation in the specific service instance. Final state 520 ends the session for the specific service instance.

The programmer creates abstract visualization model 500 based on direct binding of predetermined user actions with model elements of the generic service model. Abstract visualization model 500 is an abstract FSM, which captures the generalized "service-based" generic user interaction flow pattern. In this illustrative example, visualization model 500 is expressed as a directed graph. Alternatively, abstract visualization model 500 may be expressed as a state transition table.

Each node of this directed graph is a state in abstract visualization model 500. Each state of abstract visualization model 500 is a visualization state. In addition, each directed edge of this directed graph is a transition triggered by a transition condition. Each transition condition is a predetermined user action.

Abstract visualization model 500 also includes transition conditions 522-550. Transition condition 522 is a first usage user action in the specific service instance, which transitions from service entity state 502 to set access identification state 504. Transition condition 524 is a successful user action to set access identification, which transitions from set access identification state 504 to final state 520. Transition condition 526 is a subsequent user action, which transitions from service entity state 502 to service interface operation menu state 506.

Transition condition 528 is a user choice to set or customize a visualization state of a service operation interface, which transitions from service interface operation menu state 506 to user customization control state 508. Transition condition 530 is a completed user customization action for a service operation interface, which transitions from user customization control state 508 to final state 520. Transition condition 532 is a user choice to update access identification, which transitions from service interface operation menu state 506 to current access validation state 510. Transition condition 534 is a successful user action to update the current access validation, which transitions from current access validation state 510 to set access identification state 504. Transition condition 536 is an unsuccessful user action to update the current access validation, which transitions from current access validation state 510 to service interface operation menu state 506.

Transition condition 538 is a user choice to perform a specific service interface operation in the given service instance, which transitions from service interface operation menu state 506 to do service interface operation state 512. Transition condition 540 is a user choice to handle an in message, which transitions from do service interface operation state 512 to handle in message interface operation state 514. Transition condition 542 is a handled in message, which transitions from handle in message interface operation state 514 to do service interface operation state 512. Transition condition 544 is a completed service interface operation, which transitions from do service interface operation state 512 to handle out message interface operation state 516 (e.g., display the out message in the user interface). Transition condition 546 is a user choice to continue with another service interface operation, which transitions from handle out message interface operation state 516 to continue state 518. Transition condition 548 is a user choice to finish, which transitions from handle out message interface operation state 516 to final state 520. Finally, transition condition 550 is a user action to return to the service interface operation menu, which transitions from continue state 518 to service interface operation menu state 506.

When a UI control application, such as UI control application 216 in FIG. 2, instantiates a service level visualization FSM instance, such as service level visualization FSM instance 308 in FIG. 3, based on abstract visualization model 500 for the specific service instance, which conforms to a generic service model, such as generic service model 302 in FIG. 3, the UI control application concretely instantiates the actual number of service interface operations. For each service interface operation of the specific service instance, the UI control application generates and attaches to the service level visualization FSM instance, for example, do service interface operation state 512, handle in message interface operation state 514, and handle out message interface operation state 516. In addition, for each service interface operation of the specific service instance, the UI control application instantiates directed edges, such as, for example, transition conditions 538-548 above.

Further, the UI control application updates the list of service interface operations in, for example, service interface operation menu state 506 and do service interface operation state 512. Furthermore, the UI control application replaces the in message, such as, for example, a dollar amount, of the specific service instance with a concrete data type. Moreover, the UI control application also replaces the out message of the specific service instance with a concrete data type.

Then, the UI control application creates a user level visualization FSM instance by taking the output of the current setting of each customization control to activate or deactivate service interface operation branches from the service level visualization FSM instance, to select a start state, such as service entity state 502 or service interface operation menu state 506, and to select a visualization template. Thus, the UI control application dynamically generates the user level visualization FSM instance using the service level visualization FSM instance as the base and adding the effect of the current setting of each customization control.

Figure 6:
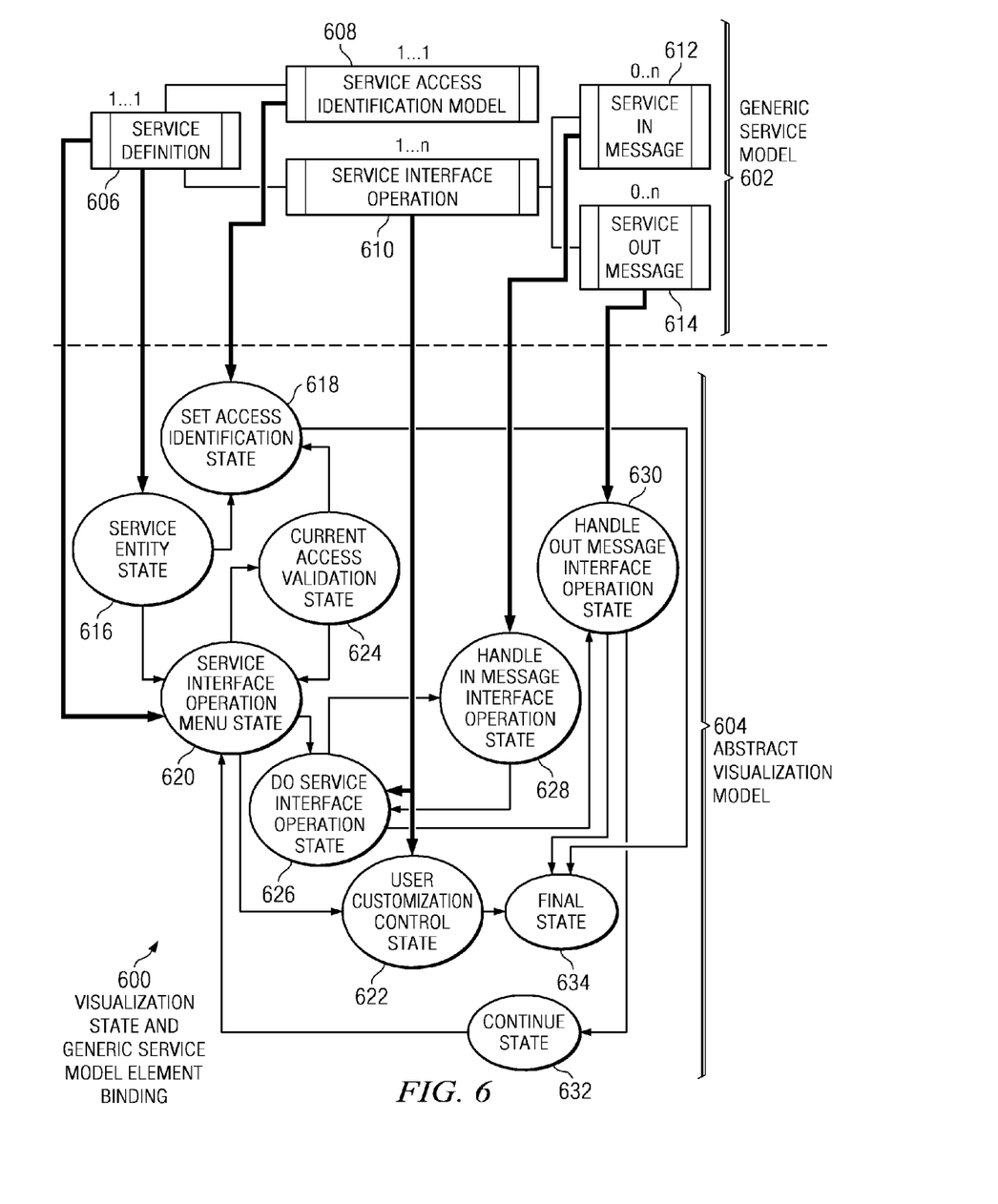
FIG. 6 is an exemplary illustration of visualization state and generic service model element binding in accordance with an illustrative embodiment.

With reference now to FIG. 6, an exemplary illustration of visualization state and generic service model element binding is depicted in accordance with an illustrative embodiment. Visualization state and generic service model element binding 600 illustrates binding between visualization states, which are units of user interaction, and model elements of a generic service model. Visualization state and generic service model element binding 600 includes generic service model element binding 602, such as generic service model 400 in FIG. 4, and abstract visualization model 604, such as abstract visualization model 500 in FIG. 5.

Generic service model 602 includes model elements service definition 606, service access identification model 608 service interface operation 610, service in message 612, and service out message 614. Abstract visualization model 604 includes visualization states service entity state 616, set access identification state 618, service interface operation menu state 620, user customization control state 622, current access validation state 624, do service interface operation state 626, handle in message interface operation state 628, handle out message interface operation state 630, continue state 632, and final state 634.

A UI control application, such as UI control application 216 in FIG. 2, binds the model elements of generic service model 602 to the visualization states of abstract visualization model 604. In this exemplary illustration, the UI control application binds model element service definition 606 to visualization states service entity state 616 and service interface operation menu state 620, model element service access identification model 608 to visualization state set access identification state 618, model element service interface operation 610 to visualization states user customization control state 622 and do service interface operation state 626, model element service in message 612 to visualization state handle in message interface operation state 628, and model element service out message 614 to visualization state handle out message interface operation state 630. However, it should be noted that visualization state and generic service model element binding 600 is only meant as an exemplary illustration and not intended as a limitation on illustrative embodiments. Illustrative embodiments may include more or fewer model elements and visualization states as needed by processes of illustrative embodiments. In addition, illustrative embodiments may bind any combination of model elements and visualization states as needed by processes of illustrative embodiments.

Figure 7:
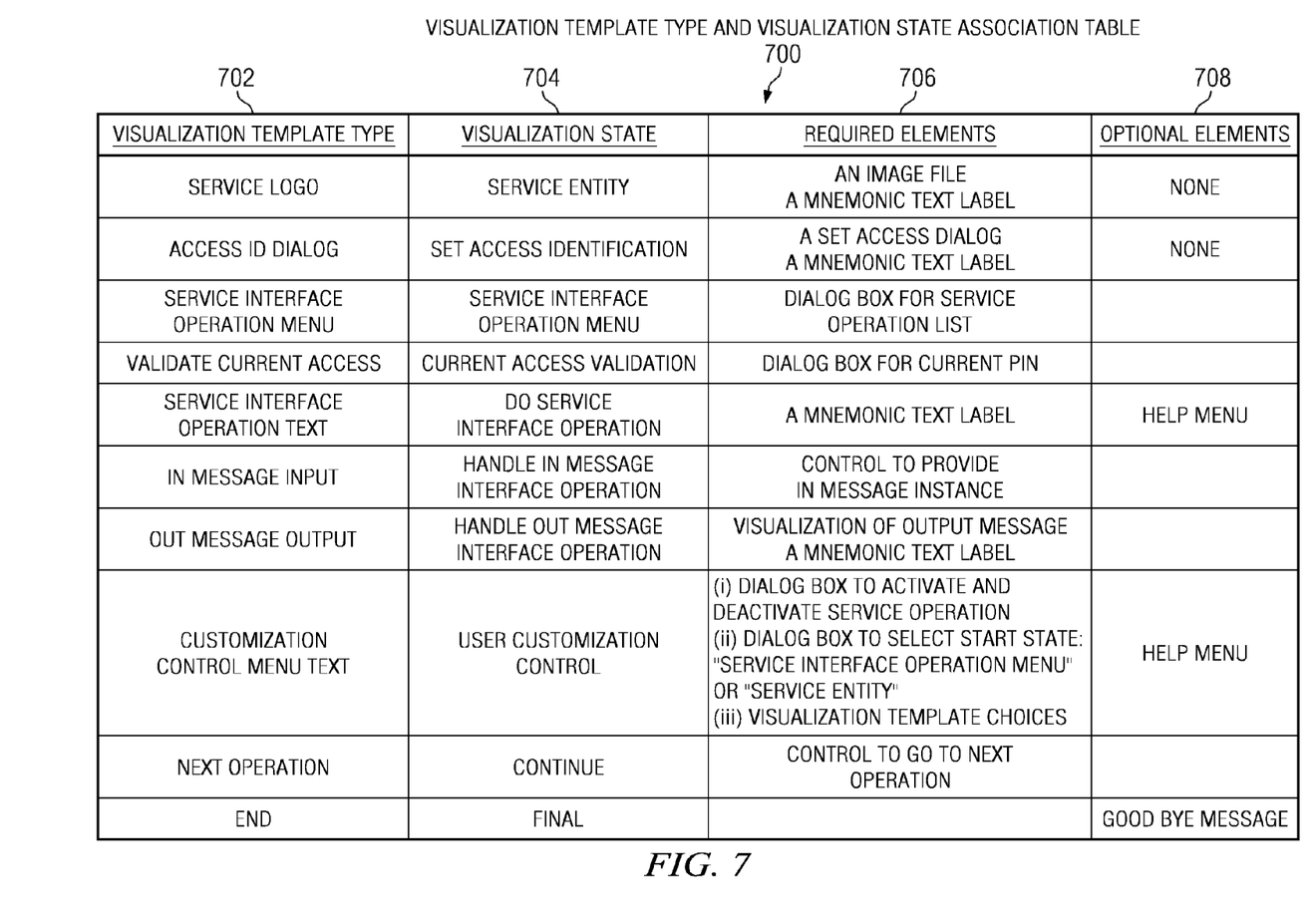
FIG. 7 is an exemplary illustration of a visualization template type and visualization state association table in accordance with an illustrative embodiment.

With reference now to FIG. 7, an exemplary illustration of a visualization template type and visualization state association table is depicted in accordance with an illustrative embodiment. Visualization template type and visualization state association table 700 is a table of associations between visualization template types and corresponding visualization states. Visualization template type and visualization state association table 700 includes visualization template type 702, visualization state 704, required elements 706, and optional elements 708.

Visualization template type 702 includes a list of template types corresponding to the list of visualization states in visualization state 704. It should be noted that each visualization state of an abstract visualization model has only one corresponding visualization template type. The visualization template type defines the parameters and points of variability required as units of user visualization and user interaction in a service interface.

The visualization states in visualization state 704 correspond to the visualization states in abstract visualization model 604 in FIG. 6. Required elements 706 are the elements that are required by the corresponding visualization state in visualization state 704. Optional elements 708 are the elements, if any, that are optional for the corresponding visualization state in visualization state 704.

In this exemplary illustration, visualization template type service logo is associated with visualization state service entity, which requires an image file. Visualization template type access ID dialog is associated with visualization state set access identification, which requires a set access dialog. Visualization template type service interface operation menu is associated with visualization state service interface operation menu, which requires a dialog box for a service operation list. Visualization template type validate current access is associated with current access validation, which requires a dialog box for a current personal identification number (PIN). Visualization template type service interface operation text is associated with visualization state do service interface operation, which requires a mnemonic text label and may optionally include a help menu.

Visualization template type in message input is associated with visualization state handle in message interface operation, which requires a control to provide an in message instance. Visualization template type out message output is associated with visualization state handle out message interface operation, which requires a visualization of an output message. Visualization template type customization control menu text is associated with visualization state user customization control, which requires a dialog box to activate or deactivate a service interface operation, a dialog box to select a start state, and a list of visualization template choices associated with the corresponding visualization template type and may optionally include a help menu. Visualization template type next operation is associated with visualization state continue, which requires a control to go to the next service interface operation. Visualization template type end is associated with visualization state final, which may optionally include a good bye message.

With reference now to FIG. 8, a sample scenario is depicted in accordance with an illustrative embodiment. Sample scenario 800 is an example of specific service instance for an airline. In particular, Airline ABC wants to provide a service to enable clients to check frequent flyer points, query flight availability, and transfer frequent flyer points. As a result, Airline ABC develops a specific service instance that includes service entity 802, service interface operation 804, service in message definition 806, service out message definition 808, service level visualization FSM instance 810, concrete visualization component 812, user level visualization FSM instance 814, and output visualization artifacts 816.

Service entity 802 includes, for example, a service name, such as "Frequent Flyer Program". In addition, service entity 802 includes a service endpoint, such as network address http://great.example.com/2008/FrequentFlyerProgram.

Service interface operation 804 includes "check frequent flyer points", which has an in message of "my frequent flyer card number" and an out message of "total points." In addition, service interface operation 804 includes "query flight availability", which has an in message of "starting location", "destination", "start date", "return date", and "number of travelers" and an out message of "flight instance". Also, service interface operation 804 includes "transfer frequent flyer points", which has an in message of "my frequent flyer card number" and "recipient frequent flyer card number" and an out message of "transfer status".

Service in message definition 806 includes definitions for "frequent flyer card number", "starting location", "destination", "start date", "return date" and "number of travelers". Service out message definition 808 includes definitions for "total points", "flight instance", and "transfer status".

Service level visualization FSM instance 810 of the "Frequent Flyer Program" service instance includes three branches of service interface operation 804. The three branches of service interface operation 804 are "check frequent flyer points", "query flight availability", and "transfer frequent flyer points". In addition, each service interface operation branch includes a corresponding in message state and a corresponding out message state.

Concrete visualization component 812 is created by providing all the necessary image icons, user interface widgets, controls, and menus, and the like. User level visualization FSM instance 814 is generated after the user selects to activate or deactivate service interface operations and sets a visualization state as a start state. In this illustrative example, the end user may select to activate all three of the service interface operations (i.e., "check frequent flyer points", "query flight availability", and "transfer frequent flyer points") or the end user may select a smaller subset thereof. For example, the end user may decide to deactivate "transfer frequent flyer points" because the end user never uses this feature. In addition, the end user may set the visualization state "service interface operation menu" as the start state, as opposed to the visualization state "service entity".

Finally, output visualization artifacts 816 are generated based on user level visualization FSM instance 814. For example, the HTML of the "service interface operation menu" visualization state may only show two available service interface operations, such as "check frequent flyer points" and "query flight availability", instead of the default three service interface operations. The service interface operation branch of "transfer frequent flyer points" does not exist in user level visualization FSM instance 814 because the end user deactivated this branch, although the service interface operation branch of "transfer frequent flyer points" still exists in service level visualization FSM instance 810. However, the end user may choose to "reactivate" the "transfer frequent flyer points" service operation via a user customization control state, such as user customization control state 622 in FIG. 6.

Consequently, illustrative embodiments allow an end user to interact with only end user selected artifacts within the service interface. In addition, illustrative embodiments allow service interface customization by an end user to be totally performed on a client device with zero dependency on server side processes or programming resulting in a user level visualization artifact, such as, for example, a web page, that eliminates user unwanted server side function in units of service operations as expressed by the user via deactivation. However, it should be noted that processes of illustrative embodiments may be located on a server device in addition to, or instead of, the client device.

Figure 9:
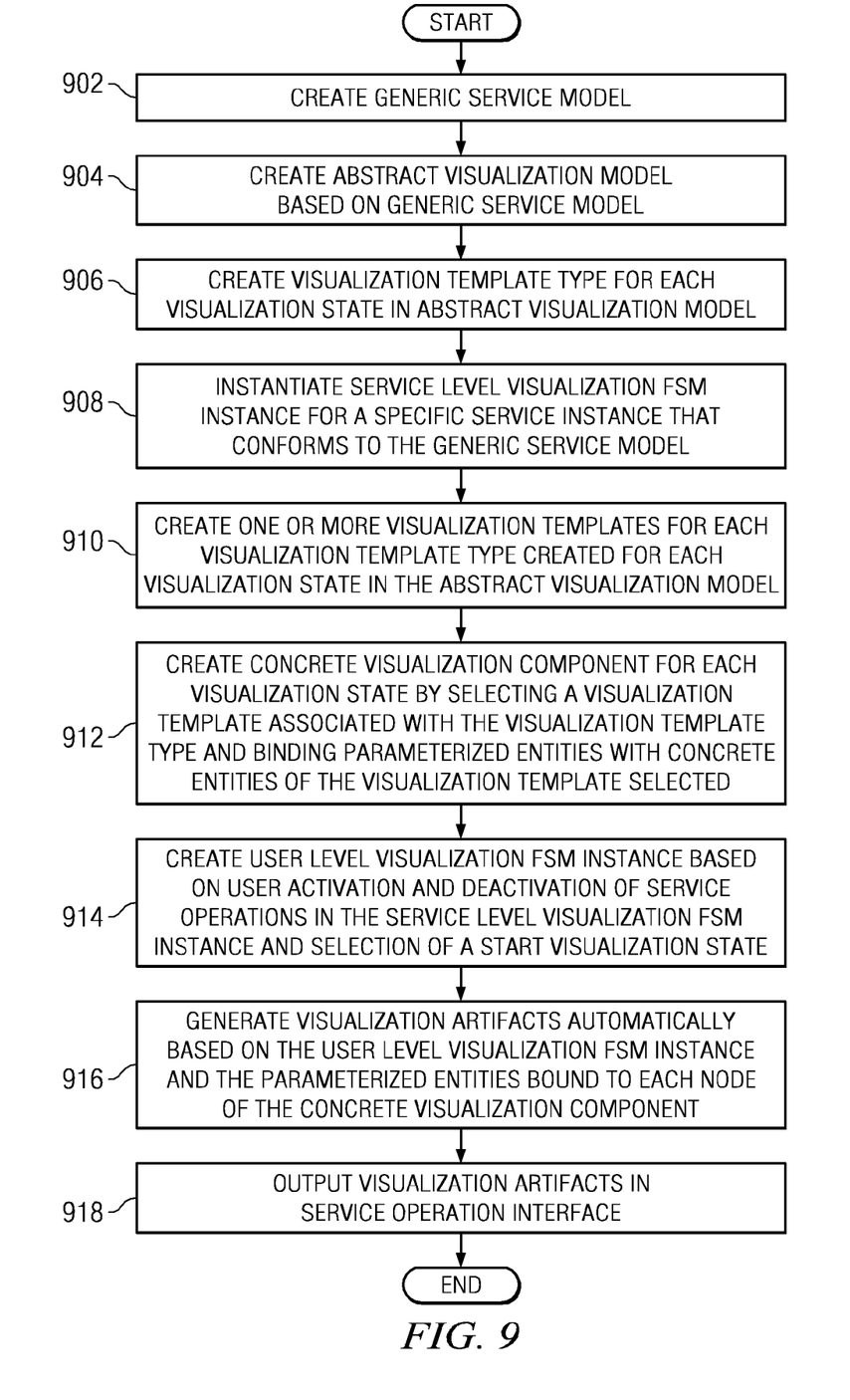
FIG. 9 is a flowchart illustrating an exemplary process for automatically generating visualization artifacts in a service operation interface in accordance with an illustrative embodiment.

With reference now to FIG. 9, a flowchart illustrating an exemplary process for automatically generating visualization artifacts in a service operation interface is shown in accordance with an illustrative embodiment. The process shown in FIG. 9 may be implemented in a UI controller, such as UI control application 216 in FIG. 2.

The process begins when a programmer creates a generic service model, such as generic service model 400 in FIG. 4, for a specific service instance (step 902). Subsequent to creating the generic service model in step 902, the programmer creates an abstract visualization model, such as abstract visualization model 500 in FIG. 5, based on the generic service model (step 904). Then, the programmer creates a visualization template type, such as visualization template type 306 in FIG. 3, for each visualization state, such as visualization states 502-520 in FIG. 5, in the abstract visualization model (step 906).

Then, the programmer utilizes the UI controller to instantiate a service level visualization FSM instance, such as service level visualization FSM instance 308 in FIG. 3, for the specific service instance that conforms to the generic service model (step 908). In addition, the UI controller creates one or more visualization templates for each visualization template type created for each visualization state in the abstract visualization model (step 910). Then, the UI controller creates a concrete visualization component, such as concrete visualization component 312 in FIG. 3, for each of the visualization states by selecting a visualization template associated with the visualization template type and binding parameterized entities with concrete entities of the selected visualization template (step 912).

Then, the UI controller creates a user level visualization FSM instance, such as user level visualization FSM instance 314 in FIG. 3, based on user activation and deactivation of service interface operations in the service level visualization FSM instance and selection of a start visualization state (step 914). Then, the UI controller automatically generates visualization artifacts, such as output visualization artifacts 316 in FIG. 3, based on the user level visualization FSM instance and the parameterized entities bound to each node of the concrete visualization component (step 916). Then, the UI controller outputs the visualization artifacts in a service operation interface for the end user to visualize and interact with (step 918). The process terminates thereafter.

Thus, illustrative embodiments of the present invention provide a computer implemented method, system, and computer program product for automatic individualized personalization of user visualization and user interaction in an SOA service interface. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically generating visualization artifacts corresponding to related service operation interfaces, the computer implemented method comprising:
   generating a generic service model for a specific service instance based on user input, wherein the generic service model includes a plurality of model elements that define the specific service instance;
   generating an abstract visualization model based on the user input and the generic service model for the specific service instance, wherein the abstract visualization model includes a plurality of visualization states;
   generating a visualization template type for each of the plurality of visualization states in the abstract visualization model based on the user input;
   instantiating a service level visualization finite state machine instance, wherein the service level visualization finite state machine instance conforms to the generic service model for the specific service instance;
   generating one or more visualization templates for each visualization template type generated for each of the plurality of visualization states in the abstract visualization model;
   generating a concrete visualization component for each of the plurality of visualization states by selecting a visualization template from the one or more visualization templates associated with the visualization template type that corresponds to a particular visualization state and binding parameterized entities with concrete entities of the visualization template selected;
   generating a user level visualization finite state machine instance for the specific service instance based on user activation and deactivation of service operations in the specific service instance and user selection of a start visualization state, wherein the service operations are included in the service level visualization finite state machine instance for the specific service instance;
   generating visualization artifacts automatically based on the user level visualization finite state machine instance and parameterized entities bound to the concrete visualization component for each of the plurality of visualization states; and
   outputting the visualization artifacts in a service operation interface of the specific service instance for a user to visualize and interact with.

2. The computer implemented method of claim 1, wherein the specific service instance is an online service provided by an enterprise.

3. The computer implemented method of claim 1, wherein individualized customization of the service operation interface by the user is performed totally on a client device with zero dependency on server side processing resulting in a user level visualization artifact that eliminates user unwanted server side function in units of service operations as expressed by the user via deactivation.

4. The computer implemented method of claim 1, wherein each of the plurality of visualization states is only associated with a single visualization template type.

5. The computer implemented method of claim 1, wherein the parameterized entities are defined by the visualization template type for each of the plurality of visualization states, and wherein the parameterized entities define how the user sees data within the service operation interface.

6. The computer implemented method of claim 1, wherein the concrete entities are defined by the visualization template selected, and wherein the concrete entities define actual image files.

7. The computer implemented method of claim 1, wherein the visualization artifacts are hypertext markup language code fragments with embedded image files.

8. The computer implemented method of claim 1, wherein the abstract visualization model is a directed graph that includes a plurality of nodes and a plurality of directed edges, and wherein each node in the plurality of nodes is a visualization state, and wherein each directed edge in the plurality of directed edges represents a predetermined user action.

9. The computer implemented method of claim 8, wherein the visualization state represents a particular context within the service operation interface that the user visualizes.

10. The computer implemented method of claim 8, wherein the predetermined user action is bound to a corresponding model element defined in the generic service model.

11. A data processing system for automatically generating visualization artifacts corresponding to related service operation interfaces, comprising:
  a bus system;
  a storage device connected to the bus system, wherein the storage device stores a set of instructions; and
  a processing unit connected to the bus system, wherein the processing unit executes the set of instructions to generate a generic service model for a specific service instance based on user input, wherein the generic service model includes a plurality of model elements that define the specific service instance; generate an abstract visualization model based on the user input and the generic service model for the specific service instance, wherein the abstract visualization model includes a plurality of visualization states; generate a visualization template type for each of the plurality of visualization states in the abstract visualization model based on the user input; instantiate a service level visualization finite state machine instance, wherein the service level visualization finite state machine instance conforms to the generic service model for the specific service instance; generate one or more visualization templates for each visualization template type generated for each of the plurality of visualization states in the abstract visualization model; generate a concrete visualization component for each of the plurality of visualization states by selecting a visualization template from the one or more visualization templates associated with the visualization template type that corresponds to a particular visualization state and binding parameterized entities with concrete entities of the visualization template selected; generate a user level visualization finite state machine instance for the specific service instance based on user activation and deactivation of service operations in the specific service instance and user selection of a start visualization state, wherein the service operations are included in the service level visualization finite state machine instance for the specific service instance; generate visualization artifacts automatically based on the user level visualization finite state machine instance and parameterized entities bound to the concrete visualization component for each of the plurality of visualization states; and output the visualization artifacts in a service operation interface of the specific service instance for a user to visualize and interact with.

12. A computer program product stored in a non-transitory computer usable medium having computer usable program code embodied therein that is executable by a computer for automatically generating visualization artifacts corresponding to related service operation interfaces, the computer program product comprising:
  computer usable program code for generating a generic service model for a specific service instance based on user input, wherein the generic service model includes a plurality of model elements that define the specific service instance;
  computer usable program code for generating an abstract visualization model based on the user input and the generic service model for the specific service instance, wherein the abstract visualization model includes a plurality of visualization states;
  computer usable program code for generating a visualization template type for each of the plurality of visualization states in the abstract visualization model based on the user input;
  computer usable program code for instantiating a service level visualization finite state machine instance, wherein the service level visualization finite state machine instance conforms to the generic service model for the specific service instance;
  computer usable program code for generating one or more visualization templates for each visualization template type generated for each of the plurality of visualization states in the abstract visualization model;
  computer usable program code for generating a concrete visualization component for each of the plurality of visualization states by selecting a visualization template from the one or more visualization templates associated with the visualization template type that corresponds to a particular visualization state and binding parameterized entities with concrete entities of the visualization template selected;
  computer usable program code for generating a user level visualization finite state machine instance for the specific service instance based on user activation and deactivation of service operations in the specific service instance and user selection of a start visualization state, wherein the service operations are included in the service level visualization finite state machine instance for the specific service instance;
  computer usable program code for generating visualization artifacts automatically based on the user level visualization finite state machine instance and parameterized entities bound to the concrete visualization component for each of the plurality of visualization states; and
  computer usable program code for outputting the visualization artifacts in a service operation interface of the specific service instance for a user to visualize and interact with.

13. The computer program product of claim 12, wherein the specific service instance is an online service provided by an enterprise.

14. The computer program product of claim 12, wherein individualized customization of the service operation interface by the user is performed totally on a client device with zero dependency on server side processing or programming.

* * * * *